United States Patent [19]

Swanson

[11] 4,375,799
[45] Mar. 8, 1983

[54] FUEL VAPORIZATION SYSTEM

[76] Inventor: Clifford S. Swanson, 1420 Gervas, Manchester, Mo. 63011

[21] Appl. No.: 140,691

[22] Filed: Apr. 16, 1980

[51] Int. Cl.³ .................................................. F02M 31/02
[52] U.S. Cl. .................................... 123/549; 123/557; 261/142; 219/207
[58] Field of Search ................ 123/557, 549, 552; 219/207; 261/142

[56] References Cited

U.S. PATENT DOCUMENTS

| | | | |
|---|---|---|---|
| 2,717,827 | 9/1955 | Best | 123/557 |
| 3,618,578 | 11/1971 | Varran | 123/549 |
| 3,738,334 | 6/1973 | Farr | 123/557 |
| 3,817,233 | 6/1974 | Kihn | 123/549 |
| 3,999,525 | 12/1976 | Stumpp et al. | 123/549 |
| 4,151,821 | 5/1979 | Wichman et al. | 123/557 |
| 4,192,269 | 3/1980 | Levy | 123/549 |
| 4,213,432 | 7/1980 | Levy | 123/557 |

Primary Examiner—Charles J. Myhre
Assistant Examiner—E. Rollins Cross
Attorney, Agent, or Firm—Polster, Polster & Lucchesi

[57] ABSTRACT

A fuel vaporization system for a spark ignition, internal combustion engine in which liquid fuel (e.g., gasoline) is heated to a temperature sufficient for substantially complete vaporization of the liquid fuel prior to its being inducted into the combustion chamber(s) of the engine thereby to result in more efficient combustion of the fuel.

8 Claims, 7 Drawing Figures

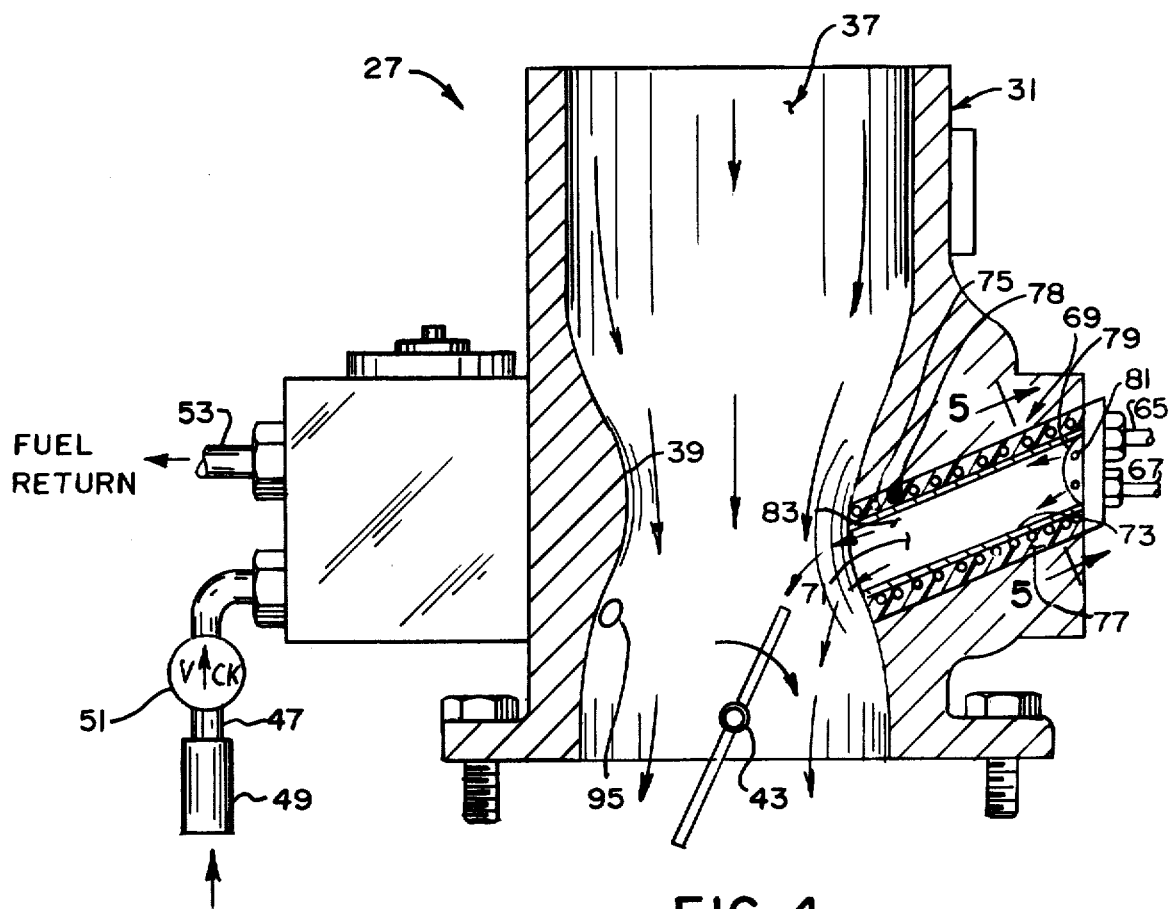
FIG. 4.
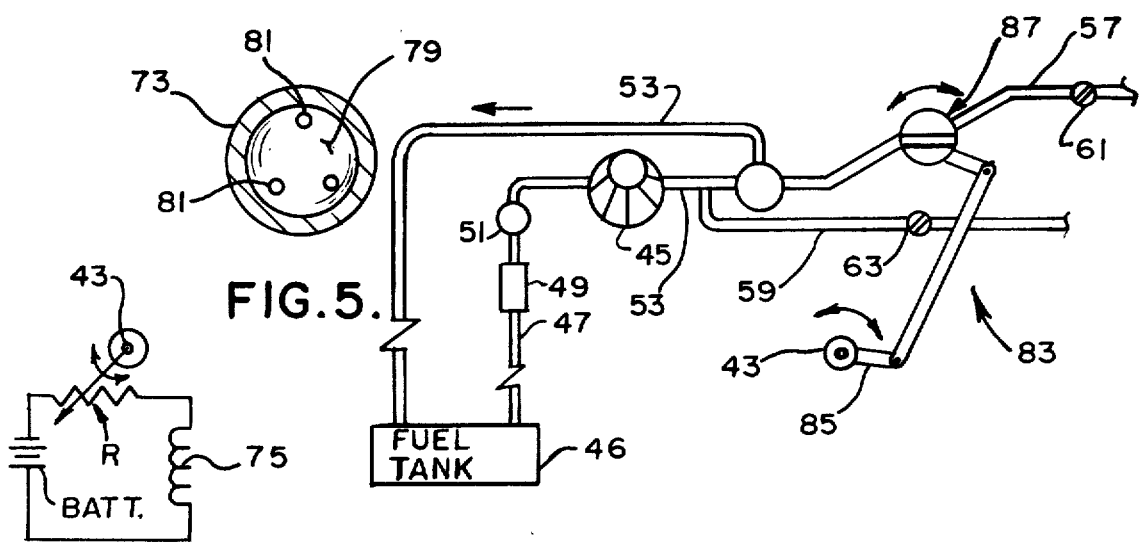
FIG. 5.
FIG. 6.
FIG. 7.

FUEL VAPORIZATION SYSTEM

BACKGROUND OF THE INVENTION

This invention relates to a fuel system for an internal combustion engine, and even more specifically, to a fuel system in which liquid fuel, such as gasoline, is heated to a temperature sufficient to vaporize substantially all of the liquid fuel prior to its being inducted into the combustion chamber(s) of the engine for combustion thereby to result in more efficient combustion of the fuel.

Typically, a spark ignition, internal combustion engine includes an air intake system which conducts combustion air into the cylinders or combustion chambers of the engine. Liquid fuel (e.g., gasoline) is mixed with the combustion air in proper porportion either by means of a carburetor or by fuel injection. In a carburetor, the combustion air flowing into the intake system is drawn through a venturi restriction in the flow path which in turn causes the velocity air to increase and thus causes its pressure to decrease. A fuel nozzle or jet is typically located in the venturi and the sub-atmospheric pressure of the air flowing through the venturi causes the liquid fuel to be drawn into the air stream. The flow rate of the fuel is determined by metering orifices or jets in the carburetor and the velocity of the fuel flowing through the venturi. The flow rate of the air through the carburetor is typically controlled by a butterfly throttle valve downstream from the venturi which in turn is controlled by a throttle control linkage (e.g., the accelerator pedal of an automobile). With the throttle valve open, an increased amount of air may be drawn through the carburetor which in turn causes a larger pressure drop across the venturi which in turn causes a proportionately greater amount of fuel to be drawn into the air stream. Thus, the carburetor is able to maintain a substantially uniform air/fuel ratio over the entire speed range of the engine.

In many spark ignition engines utilizing fuel injection, liquid fuel is injected under pressure into the combustion air in proper relation to engine speed, load, atmospheric conditions, etc. rather than being drawn into the combustion air by a venturi effect. In certain fuel injection systems, a premeasured quantity of liquid fuel is injected into the combustion air immediately prior to the air being drawn into the respective combustion chambers of the engine.

In either carbureted or fuel injected spark ignition engines, liquid fuel is discharged into the air stream. Due to the turbulance of the air stream and due to the fact that the fuel is usually drawn into the air stream under pressure, the liquid fuel is physically broken up into small, discreet droplets. It has been long known that if liquid fuel could be vaporized (i.e., transformed from a liquid to a gas) prior to ignition within the engine, more efficient combustion of the fuel would result.

Reference may be made to such prior art U.S. Pat. Nos. 3,492,457, 3,866,587, 3,930,477, 4,053,544, 4,106,454, 4,108,953, 4,141,327, 4,153,653, and 4,157,700 which disclose various fuel heaters and vaporization systems in the same general field as the present invention. However, the prior art references differ significantly from the fuel vaporization system of the present invention.

For example, the above-noted prior art U.S. Pat. Nos. 3,492,457, 3,390,477, 4,106,454, 4,108,953 and 4,141,327 may be generally characterized as disclosing heaters disposed in the intake manifold of the engine downstream from a carburetor venturi for heating both the combustion air flowing through the cylinders and the liquid fuel entrained therein. Of course, in order to heat the liquid fuel to a temperature sufficient to vaporized fuel, the heater must heat not only the fuel but the combustion air. Thus, these prior systems required relatively large capacity heaters.

U.S. Pat. No. 3,866,587 discloses an electrical control circuit for heating automotive fuel during cold start conditions so as to insure that the liquid fuel is more ready atomized when injected into the intake system.

U.S. Pat. Nos. 4,053,544 and 4,153,653 disclose fuel induction systems which include a vacuum chamber in communication with the air induction system. A fuel vaporizer is provided in the vacuum chamber which initially is heated by an electric coil and which, after the engine comes up to temperature, is heated by means of air surrounding the fuel line which in turn has been heated by the exhaust gases of the engine. The vaporized fuel is discharged into the vacuum chamber and then is drawn into the intake manifold through a pair of rotating screens. Additionally, a vacuum feedback system is provided which controls the supply of fuel to the vaporizer.

U.S. Pat. No. 4,157,700 discloses a fuel vaporization system in which fuel is heated by means of a magnitron microwave heater.

Among the several objects and features of the present invention may be noted the provision of an improved fuel intake system for a spark ignition engine in which liquid fuel (e.g., gasoline) is heated to a temperature sufficient for substantially complete vaporization of the fuel prior to its being introduced into the combustion air flowing into the engine;

The provision of such a fuel system which results in more efficient combustion of the fuel in the engine thus providing increased efficiency (e.g., gas mileage) and decreased exhaust emissions;

The provision of such a system in which the liquid fuel is physically broken into a fine mist or spray prior to its being heated thereby to insure more complete vaporization of the liquid fuel;

The provision of such a system which will immediately and automatically terminate the flow of vaporized fuel to the engine in the event of a fire in the fuel intake system;

The provision of such a fuel vaporization system which may be used in any attitude or position of the engine; and The provision of such a system which is feasible and economical to manufacture, which is relatively easy to maintain, and which may be readily repaired, if repair is required.

Other objects and features of this invention will be in part pointed out and in part apparent hereinafter.

SUMMARY OF THE INVENTION

Briefly stated, this invention relates to an internal combustion, spark ignition engine having air intake means and means for delivering a metered amount of liquid fuel to the air intake system for introduction of the fuel into the air flowing into the engine wherein the improvement of this invention comprises a fuel pump for drawing liquid fuel from a fuel supply in greater quantity than can be used for the engine and for discharging the liquid fuel under pressure for delivery to the engine and for returning excess liquid fuel back to the fuel supply. Further, means is provided responsive to the fuel demand of the engine for increasing or decreasing the amount of liquid fuel discharged from the fuel pump for delivery to the engine thereby to maintain the air/fuel ratio of the air and the fuel mixture drawn into the engine within a desired range throughout the operating speed range of the engine. Still further, means is provided for heating the liquid fuel delivered to the engine from the pump and for discharging vaporized fuel directly into the intake system of the engine, the heater means heating the fuel to a temperature sufficient to vaporize substantially all of the liquid fuel prior to its being discharged into the intake system.

BRIEF DESCRIPTION OF THE DRAWINGS

FIG. 4 is a greatly enlarged vertical cross-sectional view taken along line 4—4 of FIG. 2 illustrating a heater for vaporizing liquid fuel prior to the fuel being introduced to the combustion air flowing through the carburetor;

FIG. 5 is an enlarged cross-sectional view taken along line 5—5 of FIG. 4 illustrating jets for the introduction of liquid fuel into a fuel vaporization chamber in which the fuel is heated and vaporized, the jets being shown on an enlarged scale for purposes of illustration;

FIG. 6 is a semi-diagramatic view of the fuel pump and control valve for varying the amount of fuel pumped into the vaporization chamber in response to the fuel demand of the engine; and FIG. 7 is a schematic diagram of the electrical system energizing the fuel vaporization system.

Corresponding reference characters indicate corresponding parts throughout the several views of the drawings.

DESCRIPTION OF A PREFERRED EMBODIMENT

Figure 1:
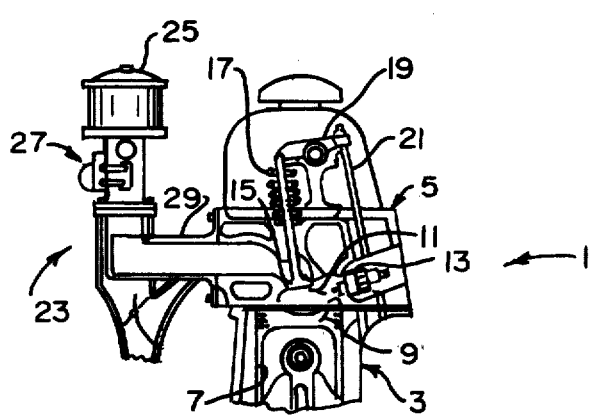
FIG. 1 is a lateral vertical cross-sectional view of a typical spark ignition, internal combustion engine showing the major components thereof and illustrating the provision of a fuel vaporization system of the present invention included in the air and fuel intake system for the engine.
Figure 2:
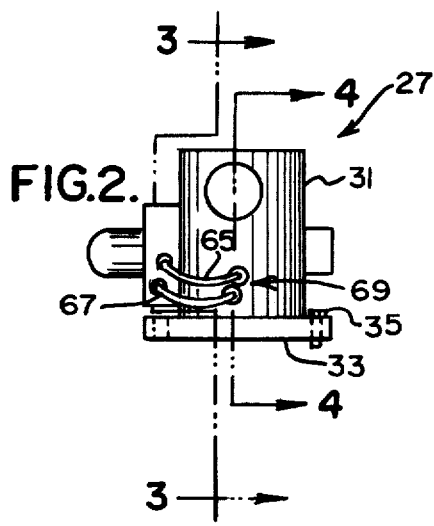
FIG. 2 is an enlarged and elevational view of the fuel vaporization system of the present invention as it is incorporated in a carburetor.

Referring now to the drawings, a spark ignition, internal combustion engine is shown in its entirety by reference character 1 in FIG. 1. The engine includes a block 3 and a head 5 removably secured to the block in a conventional manner. One or more cylinders, as indicated at 7, are provided within the block and pistons 9 are recriprocable within the cylinders. With the piston at top dead center, a combustion chamber, as indicated at 11, is defined by the top of the piston and a portion of the head. As is conventional, a spark plug 13 is threaded in a port in the head for ignition of an air fuel mixture contained within the combustion chamber. Head 5 includes an intake valve 15 and an exhaust valve (not shown) for each cylinder. The intake valve is shown to be held in its closed position by means of a compression coil spring 17. As illustrated, a rocker arm 19 is cam operated by means of push rod 21 for opening and closing intake valve 15 in timed relation to piston 9. Further, engine 1 includes an air/fuel intake system, as generally indicated at 23, including an air cleaner 25 and a carburetor 27. An intake manifold interconnects the carburetor to the intake valves 15 of the engine.

Figure 3:
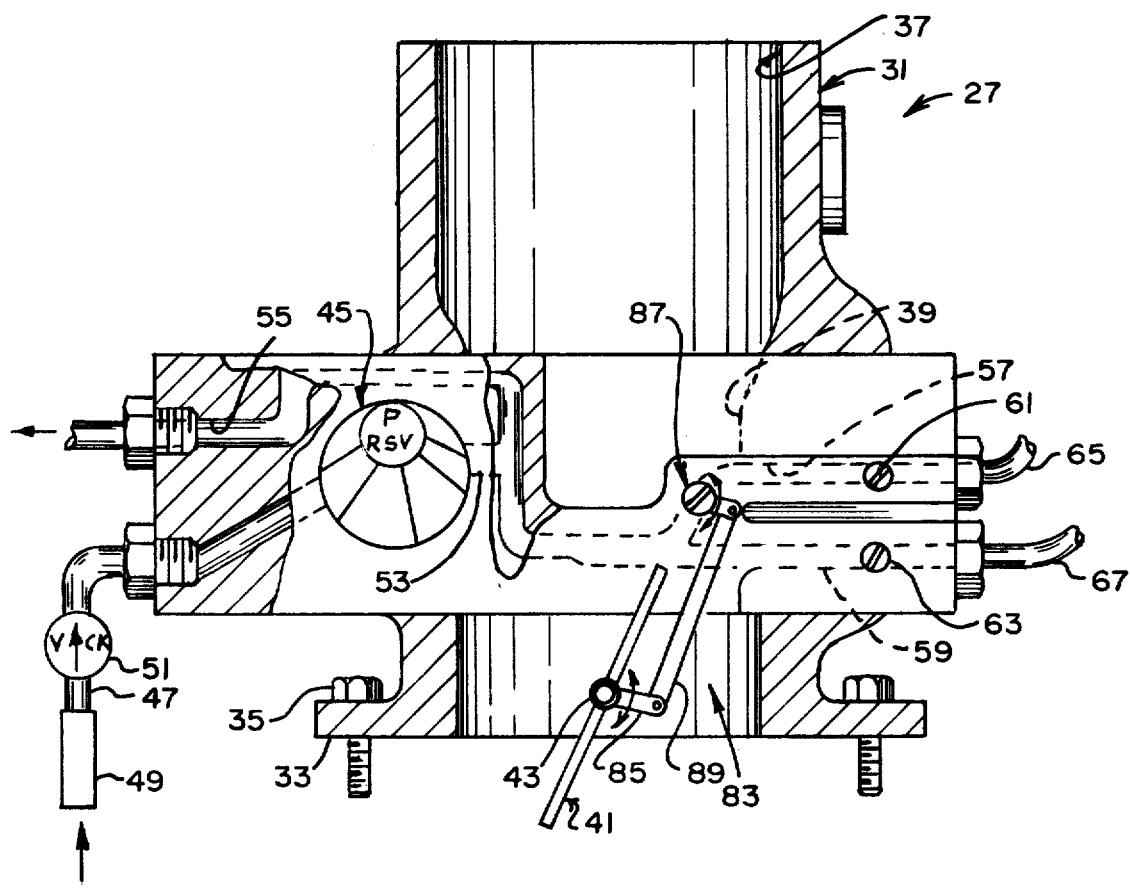
FIG. 3 is a greatly enlarged vertical cross-sectional view of the carburetor taken on line 3—3 of FIG. 2.

Referring now to FIGS. 2-5, carburetor 27 is shown to include a carburetor body 31 having a mounting flange 33 at its bottom end and including bolts 35 for sealingly mounting the carburetor body to the intake manifold 29. An air flow passage, as generally indicated at 37, extends through the carburetor body 31 and a venturi or throat 39 is provided within the carburetor air flow passage. Venturi 39 works in the conventional manner by restricting the flow of air through the carburetor thereby to increase its velocity and to decrease its pressure. The flow of air through the carburetor venturi is controlled by a butterfly-type throttle valve, as generally indicated at 41. This butterfly valve is shown pivotally mounted on a throttle pivot shaft 43 downstream from venturi 39 thereby to rotate between an open position (as shown in FIGS. 3 and 4) so as to permit the flow of air through the carburetor substantially without restriction and a closed position (not shown) in which the throttle plate blocks substantially the flow of air through the carburetor. It will be appreciated, however, that the throttle valve could be located elsewhere in the carburetor body, such as is readily apparent to those skilled in the art.

As shown best in FIG. 3, the fuel induction system of the present invention, includes a fuel pump, as generally indicated at 45, mounted within a portion of carburetor body 31. As shown, fuel pump 45 is preferably a rotary sliding vane pump having a constant pressure output with fuel bypass regulator and return. It will be understood that fuel pump 45 is rotary driven by a suitable electric motor (not shown) preferably incorporated in carburetor body 31. However, within the broader aspects of this invention, it will be understood that the fuel pump and motor (as well as other fuel flow lines hereinafter described) may be located remote from the carburetor body.

As shown in FIG. 6, fuel pump 45 is interconnected to a fuel tank 46 by means of a fuel line 47. The fuel line includes a fuel filter 49 and a one-way check valve 51 interposed between the fuel tank and the inlet to pump 45 with check valve 51 preventing the reverse flow fuel from the pump to the tank 46. Fuel discharged from the pump is directed either to a main pump outlet line 53 which in turn directs fuel for induction into the engine or a fuel return line 55 which directs excess fuel not required by the engine back to fuel tank 46. Fuel pump 45 is capable of delivering fuel to the engine at a flow rate in excess of the rate of fuel consumed by the engine and of maintaining desired constant fuel pressure for the fuel being pumped into the fuel intake system of the present invention.

Carburetor body 41 further includes a main fuel line 57 and an idle fuel line 59 in communication with outlet line 53 from pump 45. Both the main and idle fuel lines include respective adjustment valves 61 and 63 for precisely metering the flow of fuel therethrough. Fuel from the main and idle fuel passages included within carburetor body 31 is directed to a fuel vaporization system of the present invention by a main fuel line 65 and a idle fuel line 67 on the exterior of the carburetor body. However, it will be understood that fuel passages 57 and 59 may be directly connected to the fuel vaporization system of the present invention without the necessity of external fuel line 65 and 67. Further, it will be understood that solenoid valves (not shown) may be incorporated in fuel lines 65 and 67 thereby to positively cutoff the flow of fuel therethrough so as to prevent excess fuel from leaking into the carburetor after shutting off the motor.

As shown in FIG. 4, the liquid fuel vaporization system or means of the present invention is indicated in its entirety by reference character 69. This fuel vaporization means includes a vaporization chamber 71 defined by a cylindrical shell 73 embedded in one wall of carburetor housing or body 31 defining the venturi 39 of the carburetor. Shell 73 is surrounded by heating elements 75 (e.g., wrappings of electrical resistant heating wire or the like) which are energized by a suitable source of electric power (e.g., the electrical system of an automobile or the like). Heating elements 75 are thermally insulated from carburetor body 31 by means of heat insulation material 77.

Heating elements 75 are controlled by a conventional thermocouple feedback circuit, the thermocouple sensor of which is indicated at 78, so as to maintain the shell 73 at a predetermined temperature level, for example about 400° F. (204° C.), so as to result in the efficient vaporization of the fuel. The vaporization means further includes a liquid fuel inlet head 79 including spray ports 81, the spray ports being in communication with the fuel discharged from main and idle fuel lines 65 and 67. Preferably, these spray ports 81 are relatively small (e.g., ranging between about 0.002 and 0.015 inches (0.51 and 0.38 mm.)) so as to result in the liquid fuel being sprayed therefrom in a fine mist. As the pressurized fuel is sprayed from ports 81, the fuel is initially atomized as it passes through the spray ports and is directed generally longitudinally and radially outwardly toward the heated shell 73. Shell 73 is desirably heated by heating elements 75 to a temperature sufficient to vaporize the liquid fuel (i.e., to transform liquid fuel into a gaseous state). Of course, upon vaporization in the fuel, the vaporized fuel expands and occupies considerably more volume as compared to the liquid fuel. The vaporized fuel is thus positively directed out the open end of vaporization chamber 71 under pressure and is drawn by the venturi effect of combustion air passing through venturi 39 into the air stream so as to become thoroughly intermixed with the air stream. Even though some condensation of the vaporized fuel may occur upon encountering the flow of combustion air into the engine, the vaporized fuel will, by the time condensation occurs, be so thoroughly mixed with the combustion air that the desired effect of the fuel vaporization of the present invention (i.e., thorough intermixing of the fuel and the combustion air) is achieved.

Referring now to FIGS. 3 and 6, means, as indicated generally at 83, is provided for varying the amount of fuel admitted into fuel vaporization chamber 71 for vaporization of the fuel in response to the fuel demand (i.e., engine speed and load) of the engine. More specifically, this means is shown to include a lever 85 fixedly mounted on pivot shaft 43 for throttle valve plate 41. Fuel demand control valve, as generally indicated at 87, is provided in main fuel passage 57 for regulating the flow of fuel through the main fuel passage. For example, the control valve may be a ball valve or the like. Control valve 87 is rotatable between a closed position in which a predetermined quantity of fuel is allowed to flow through idle flow passage 59 to the fuel vaporization chamber 71 so as to supply sufficient fuel for the engine while idling. Upon opening throttle valve 41, a link 87 pivotally connected between lever 85 and a crank on the control valve rotates the latter so as to progressively open the valve and thereby to permit additional quantities of fuel to flow from fuel pump 45 into the main fuel passage 57 for introduction into fuel vaporization chamber 71. It will be appreciated that as throttle valve 41 is progressively opened, valve 87 will likewise be progressively opened for the increased supply of fuel into the engine as required by the increase engine speed and load.

It will be appreciated by those skilled in the art that while other mechanical or electronic means may be provided for regulating the flow of fuel into the engine speed or demand, the above-described mechanical interconnection between the fuel system and the throttle valve may be preferable because of its relative simplicity.

Gasoline is a blend of a number of hydrocarbon products forming a mixture. Gasoline is purposefully blended so as to adjust the various properties of the fuel so as to give desired operating characteristics to the fuel. Moreover, the blending of the gasoline is varied throughout the course of the year so as to take into account climatic temperature changes. Generally, a gasoline blend is selected so that it has a low boiling point (flash point) to enhance engine starting characteristics. Further, a gasoline blend with low distillation temperatures generally has the best running performance and results in low dilution of crankcase lubricants. However, low temperature boiling points for the components of a gasoline blend will, during hot weather conditions, result in vapor lock problems because the fuel line temperatures will permit vaporization of the gas in the fuel lines and in the carburetor float bowl thus interupting the flow of gasoline to the engine. Further, low boiling point gasoline blends will result in increased hydrocarbon vapor emissions to the atmosphere emitted both from an automobile fuel system and during handling and transport of bulk gasoline. Still further, low boiling point gasolines present a greater danger of accidental fire and explosion.

To promote efficient combustion of the gasoline in an internal combustion, spark ignited engine, fuel vaporization system 69 of the present invention enables the use of gasoline having a relatively high boiling point, but yet insures the complete vaporization of the gasoline prior to induction into the engine thereby to enhance starting characteristics, performance, and efficiency of the engine and to reduce the hydrocarbon vapor emissions and fire hazard associated with low boiling temperature gasoline blends.

In accordance with this invention, the walls of vaporization chamber 71 are heated by heating element 75 to a temperature sufficient to promote the substantial vaporization of the fine mist or jets of liquid gasoline sprayed into the vaporization chamber via spray ports 81. The inner walls of the shell 73 are heated to a temperature of about 400° F. (204° C.) so as to result in the vaporization of substantially all of the gasoline entering the vaporization chamber. It will be understood, however, that the temperature of the walls of the vaporization chamber may vary depending on the composition of the gasoline blend and the temperature at which substantially all of the chosen gasoline blend will vaporize. Further, it is understood that it is not necessary for the liquid gasoline sprayed from the spray ports 81 to come into the physical contact with the heated wall of shell 73, but rather that the elevated temperature environment of vaporization chamber 71 promotes vaporization of the liquid gasoline without the requirement that the liquid gasoline physically contact the heated walls of the chamber.

Further, in accordance with this invention, it will be understood that heating elements 75 supply sufficient heat to the vaporization chamber so as to vaporize substantially all of the gasoline flowing to the engine even full load conditions. However, because only the liquid gasoline must be heated to a temperature sufficient for vaporization thereof and not the entire mass of the combustion air flowing to the engine, heating elements 75 of the vaporization system of the present invention need not have relatively large quantities of electrical energy supplied thereto.

As a variation on the fuel system of the present invention, it will be appreciated that a flame detection device, as indicated at 95 in FIG. 4, may be provided within the throat 39 of the carburetor to detect the presence of a flame in the carburetor, such as may be occasioned by backfiring of the engine igniting the fuel being forced into the combustion air. This flame sensor, may in one embodiment thereof, take the form of a thermocouple. The electrical output of the thermocouple may be connected via suitable circuitry (not shown) so as to deenergize fuel pump 45 in the event a flame (e.g., an unexpectedly high temperature) is detected within carburetor flow path 37 thereby to terminate the flow of fuel to the carburetor so as to extinguish the fire in the carburetor.

While the liquid fuel vaporization system of the present invention is intended to heat the liquid fuel to a temperature sufficient to vaporize substantially all of the liquid fuel, it will be understood that this vaporization temperature (about 400° F. or 204° C.) is significantly below the ignition temperature of conventional motor fuel gasoline. For example, 100 octane motor fuel gasoline is reported to have an ignition temperature of about 850° F. (450° C.), some 450° F. (232° C.) above the temperature to which the walls of the shell 73 are heated. Thus, it will be appreciated, that the vaporization system of this invention does not constitute a danger of self-ignition of the liquid fuel vaporized thereby.

Further, it will be understood to those skilled in the art that the fuel vaporization system of the present invention may readily be adapted to vaporize other gasoline blends and other liquid fuels, such as alcohol or the like.

As a variation of the fuel vaporization system of this invention, it will be understood that the power supply for heating elements 75 may be responsive to the fuel demand required by the engine so as to supply increased power to the heating elements 75 when greater quantities of fuel are required by the engine and when such increased amounts of fuel are supplied to vaporization chamber 71 by fuel pump 45. More specifically, the power supply for heaters 75 may be controlled by an adjustable rheostat R (see FIG. 7) which is variable in response to the position of throttle plate 43. This rheostat may be stationarily mounted with respect to the carburetor and it has a rotor movable with throttle shaft 43 so as to directly vary the power supplied to heater 75 in response to throttle position and hence in response to the fuel supplied to the engine.

When the apparatus of the present invention was herein described as having fuel from both main fuel line 65 and from idle fuel line 67 delivered to the vaporization chamber 71, it will be understood that the idle fuel could, within the scope of this invention, be delivered to an idle jet or port (not shown) in body 31 for discharge into the air flowing through passage 37.

In view of the above, it will be seen that the several objects of the invention are achieved and other advantageous results obtained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. In an internal combustion engine having an air intake system and means for delivering liquid fuel to said air intake means for introduction of the fuel into the air flowing into the engine, wherein the improvement of this invention comprises: a fuel pump for drawing liquid fuel from a supply of fuel in greater quantity than is required by the engine, for discharging liquid fuel under pressure for delivery to the engine, and for returning excess liquid fuel to said fuel supply, means responsive to the fuel demand of the engine for increasing or decreasing the amount of liquid fuel supplied by said fuel pump for said engine thereby to maintain the air/fuel ratio of the air and fuel mixture drawn into the engine within a desired range, means located contiguous to said intake system for heating said liquid fuel to be delivered to the engine and for discharging vaporized fuel directly into the intake system, said heating means including a housing defining a heat chamber into which liquid fuel from said fuel pump is delivered, and electrical resistance heating means for heating the surfaces of said housing defining said heat chamber to a temperature sufficient to vaporize substantially all of the liquid fuel as the liquid fuel is delivered thereto, said housing having a plurality of ports through which liquid fuel is delivered under pressure into said heating means thereby to finely divide said liquid fuel and to aid in the vaporization thereof, said chamber having an outlet in communication with said air intake system and being substantially free of obstruction whereby the vaporized fuel is discharged directly into the air intake system substantially without delay in response to the changes in the quantity of the air flowing through the air intake means, said heating means having means responsive to the fuel demand of the engine thereby to porportionately increase or decrease the amount of heat available so as to heat the liquid fuel to a temperature sufficient to vaporize substantially all of the liquid fuel prior to its being directly discharged into said intake system throughout the operating range of the engine.

2. In an engine as set forth in claim 1 wherein said intake system includes means for controlling the flow of air to the engine, this last-said means constituting said means responsive to the fuel demand of said engine for increasing or decreasing varying the flow of fuel to the engine.

3. In an engine as set forth in claim 2 wherein said fuel pump includes means for maintaining the pressure of said fuel delivered to said heating means at a predetermined pressure level.

4. In an engine as set forth in claim 3 including at least two fuel ports into said heating means, one for low speed operation of the engine, and the other for high speed operation of the engine.

5. In an engine as set forth in claim 4 further comprising means for independently adjusting the flow of fuel through each of said fuel inlet ports.

6. In an engine as set forth in claim 2 wherein said air flow control means includes a venturi in said air intake means and a throttle plate located downstream from said venturi, said throttle plate being rotatably mounted for movement between an open position in which the air flowing through said intake system is substantially free of obstruction from said throttle plate and a closed position in which said throttle plate substantially blocks the flow of air through said air intake system.

7. In an engine as set forth in claim 1 further including means in said intake means for sensing the presence of a fire within said intake means and for terminating the flow of fuel in response thereto.

8. In an internal combustion engine having air intake means and means for delivering liquid fuel to said air intake means for introduction of the fuel into the combustion air flowing into the engine, wherein the improvement of this invention comprises: a fuel pump for discharging liquid fuel under pressure for delivery to the engine, means responsive to the fuel demand of the engine for increasing or decreasing the amount of liquid fuel discharged from said fuel pump to said engine thereby to maintain the air/fuel ratio of the air and fuel mixture drawn into the engine within a desired range, means for vaporizing substantially all of said liquid fuel to be delivered to the engine from said pump and for discharging the vaporized fuel directly into the intake system, said vaporization means having an electrical heater responsive to the fuel demand of said engine so as to heat the liquid fuel to be delivered to the engine to a temperature sufficient to vaporize substantially all of the liquid fuel prior to its being discharged into the intake system throughout the operating range of the engine substantially without delay in response to the changes in the quantity of the air flowing through the air intake means, said vaporization means further having a plurality of ports through which liquid fuel is delivered under pressure into said heating means thereby to finely divide said liquid fuel and to aid in the vaporization thereof.

* * * * *